Feb. 7, 1956　　　B. W. BADENOCH　　　2,733,689
CONSTANT GAIN HYDRAULIC POWER CONTROL SYSTEM
Filed Jan. 18, 1954

INVENTOR.
BENJAMIN W. BADENOCH
BY
Ralph L. Tweedale
ATTORNEY

United States Patent Office 2,733,689
Patented Feb. 7, 1956

2,733,689

CONSTANT GAIN HYDRAULIC POWER CONTROL SYSTEM

Benjamin W. Badenoch, Los Angeles, Calif., assignor to Vickers Incorporated, Detroit, Mich., a corporation of Michigan Application January 18, 1954, Serial No. 404,536

8 Claims. (Cl. 121—41)

This invention relates to power transmissions, and is particularly applicable to those of the type comprising two or more fluid pressure energy translating devices, one of which may function as a pump and another as a fluid motor.

The invention is primarily concerned with hydraulic transmissions of the type recited having servo mechanism incorporated therein and in particular is concerned with providing a constant gain, servo mechanism control system.

In hydraulic servo control systems the servo control valve which is linked to the motor to provide a follow-up action may be utilized both as a directional and as a power control valve. The servo valve functions as a power control valve by metering motor fluid in desired quantities which vary with the deflection of the valve from neutral position. "Gain" of the valve may be defined to mean the slope of the flow versus deflection curves. A steeper slope, that is, more flow for a given deflection of the valve is called a higher gain.

In a servo mechanism system wherein there is provided a substantially constant pressure fluid source and the load is constant, it is a comparatively simple matter to maintain a predetermined system gain. If the flow is constant and the load constant the pressure drop across the throttle of the servo control valve remains substantially constant for given deflections of the servo valve. As the gain or sensitivity of the servo control valve is proportional to the pressure drop across the valve, a responsive or sensitive system with fairly accurate predetermined gain may be designed.

Where, however, variables are present in the system ahead of or beyond the servo control valve, such as load changes produce, the problem becomes a very difficult one and the designer has been faced with compromising and making sacrifices involving sensitivity, system gain, and system stability. Thus, in a variable load system, when the load is high the pressure at the motor is high and the relatively low pressure drop across the servo control valve causes it to be relatively insensitive and the gain of the valve is extremely low. When the load is low the pressure at the motor is low and the relatively high pressure drop across the throttle of the servo control valve causes it to be extremely sensitive and the gain of the valve is extremely high. The large variations in gain in any one particular system can vary from extreme sluggishness to extreme instability.

When the control of the motor is erratic and not responsive to given deflections of the power control valve the system is said to be unstable. The system is also said to be unstable when there is present undesired self-sustained oscillations of the motor and valve. These oscillations may occur not only during normal operation of the system but also occur from shock loads. Servo engineers are well aware of these well known conditions wherein there is continual overshooting of the servo valve to reach an equilibrium position, the rapid oscillation of the valve being termed "hunting."

In servo control or follow-up control systems there are a combination of factors which cause these conditions, some of which are lags in feedback caused for example, by looseness of the linkage, flexibility, and unfavorable Bernoulli forces across the servo control valve. These factors reinforce each other, particularly in high gain systems in which a small motion of the valve causes a large and a rapid motion of the load, with a resultant large and rapid correction at the servo valve through the feedback. Damping may be introduced to counteract these tendencies but must be so great in order to stabilize the system against the combined reinforced tendencies, that it counteracts any rapid controlled motion of the servo valve and hence is undesirable from this standpoint.

It is therefore an object of the present invention to provide a hydraulic servo mechanism system which will circumvent the aforementioned difficulties.

It is another object of the present invention to provide a constant gain, hydraulic servo mechanism system.

It is still another object of the present invention to provide a hydraulic servo mechanism system wherein the system gain is constant independently of pressure or load variations.

It is a further object of this invention to provide a constant gain, hydraulic servo control system which is responsive, stable and highly efficient.

Further objects and advantages of the present invention will be apparent from the following description, reference being had to the accompanying drawing wherein a preferred form of the present invention is clearly shown.

Figures 1, 2, 3:
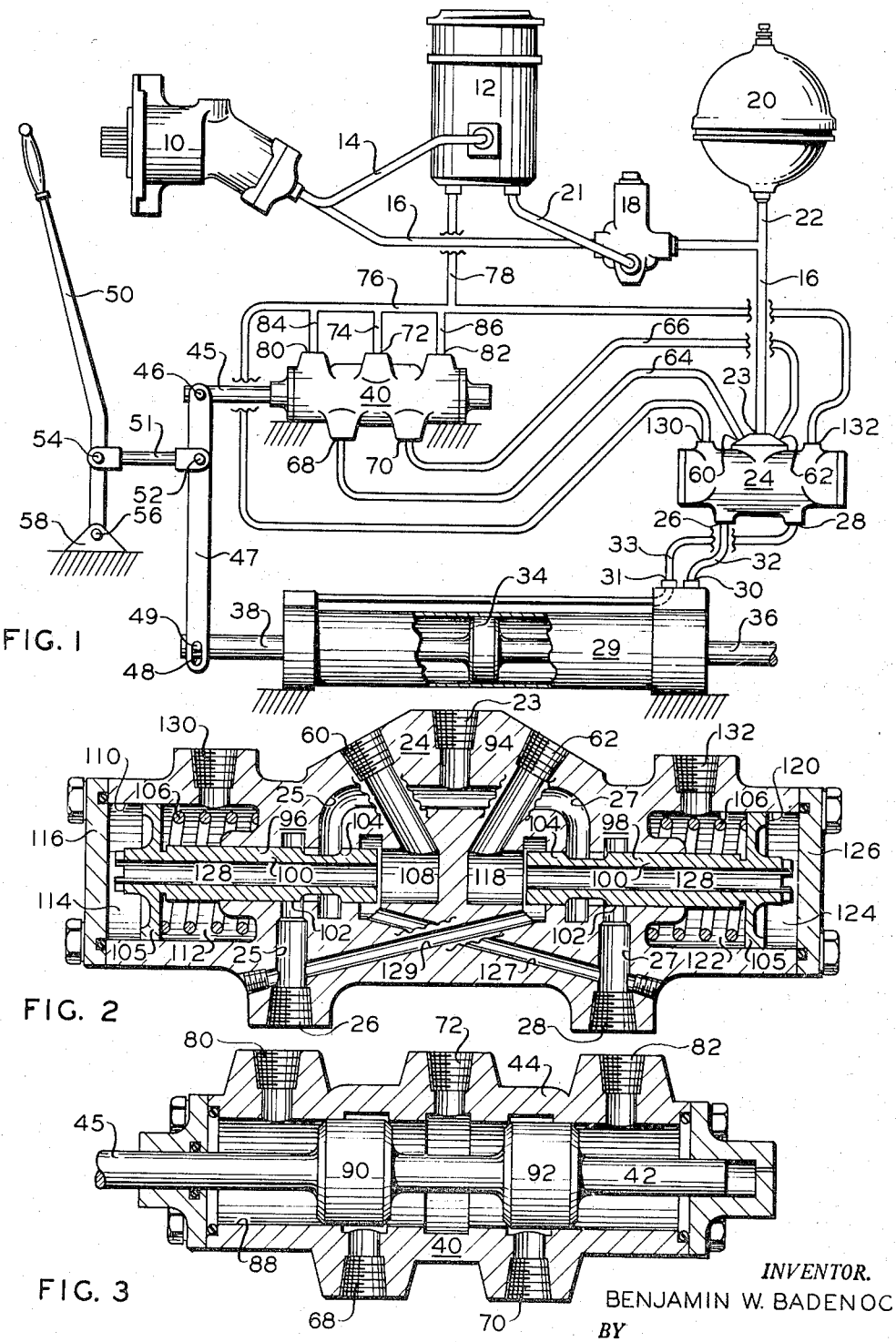
Figure 1 is a diagrammatic view of a hydraulic power transmission system embodying a preferred form of the present invention.
Figure 2 is a longitudinal sectional view of a power control valve incorporated in the hydraulic transmission system shown in Figure 1.
Figure 3 is a longitudinal sectional view of a servo control valve incorporated in the hydraulic transmission system shown in Figure 1.

Referring now to Figure 1, there is shown a constant displacement pump 10 which may be driven by a prime mover, such as an aircraft engine, not shown. The pump 10 is supplied with fluid from the reservoir 12, being connected thereto by a supply conduit 14, and delivers fluid into a pressure delivery conduit 16 in which is incorporated an unloading valve 18 and an accumulator 20 by a branch conduit 22. The unloading valve 18 bypasses the delivery of pump 10 to tank 12 through an unloading conduit 21 when a predetermined pressure is created in the accumulator 20.

The pressure delivery conduit 16 is connected to an inlet port 23 of a power control valve 24, shown in detail in Figure 2. The inlet port 23 of the power control valve 24 has connected thereto a two branched passage, one branch being indicated by the numeral 25 and which leads to an external port 26, while the other branch passage indicated by the numeral 27 leads to an external port 28. The power control valve has pressure responsive throttling mechanism mounted therein, which will be later described, and which is adapted to simultaneously throttle fluid in controlled amounts to and from a balanced type, double acting fluid motor 29. Accordingly, the power control valve ports 26 and 28 are respectively connected to the right and left end operating ports 30 and 31 of the fluid motor 29 by conduits 32 and 33 which may be either delivery or return conduits depending on the directional operation of the motor.

The motor 29 has mounted therein a fluid operated piston 34 having piston rods 36 and 38 associated therewith and extending from opposite ends of the motor. The piston rod 36 is adapted for connection to a load device, such as an aircraft surface, not shown.

The directional operation of the motor 29 is controlled by a servo valve indicated generally by the numeral 40 and shown in detail in Figure 3. The servo valve 40 has a control piston or spool 42 reciprocally mounted within a body or housing 44, the spool 42 having a portion 45 extending from the body which is pivotally connected by a pin indicated by the numeral 46 to one end of a link 47. The opposite end of link 47 is provided with a slot 48 in which a pin 49 associated with the extending portion of piston rod 38 of the motor 29 may slide and thus provide a motor valve follow-up linkage. A control lever 50 is provided for the servo valve control spool 42 which operates the spool by means of a lever arm 51 pivotally connected at 52 to the link 47 and at 54 to the control lever 50. The lower end of the control lever 50 is pivotally connected at 56 to a bracket 58 which may be suitably stationarily fastened, for example, to the frame of a vehicle or aircraft.

The servo valve 40 is adapted to control the direction of operation of the motor 29 by selective blocking of one end or the other of the motor 29 from the tank 12. As will later be explained in detail, fluid from the source is conducted through the power control valve 24 to the motor 29 and all return fluid from the motor 29 is conducted therefrom through the power control valve 24 to the servo valve 40. For the purpose of conducting motor return fluid to the servo valve the power control valve 24 is also provided with two return ports indicated by the numerals 60 and 62 which are respectively connected by conduits 64 and 66 to two return ports 68 and 70 of the servo body 44.

In operation, except in the neutral position shown of the valve spool 42, one of the return ports 68 or 70 will be connected to and the other will be blocked from a tank port 72, the latter of which is connected to the tank 12 by means of conduits 74, 76, and 78. The opposite ends of the servo valve spool are vented to the tank 12 by means of vent ports 80 and 82 which are respectively connected to the tank conduit 76 by means of conduits 84 and 86.

As shown in Figure 3, the control spool 42 is reciprocally mounted within a stepped bore 88 of the body 44 and which the several ports of the valve body intersect. The spool 42 is provided with lands 90 and 92 adapted to control communication between the valve ports and which are tapered at their opposite ends to provide proper metering of return fluid across either of the motor return ports 68 or 70 to the tank port 72. The lands of the servo valve spool 42 are preferably dimensioned to permit leakage from the motor return ports 68 and 70 across the tank port 72 with the spool in the neutral position shown, for reasons which will be later explained.

The power control valve 24 is comprised of a body 94 housing duplicate throttling devices indicated generally by the numerals 96 and 98. The throttling devices 96 and 98 are comprised of a spool 100 having throttling lands 102 and 104. The spools 100 are provided with operating pistons 105 which are biased by springs 106 to urge the throttling devices toward their fully open positions. The spool 100 of the throttling device 96 is mounted in a longitudinal bore 108 while the operating piston 105 thereof is mounted in an enlarged bore 110 which forms chambers 112 and 114 on opposite sides of the operating piston 105. The enlarged bore 110 is closed at its open end by a cover 116. The throttling device 98 is shiftably mounted in a longitudinal bore 118 while the operating piston 105 thereof is mounted in an enlarged bore 120 forming chambers 122 and 124 on opposite sides of the operating piston. The open end of enlarged bore 120 is closed by a cover 126.

When the motor 29 is operated in a leftward directional movement pressure fluid from the source enters the power control valve 24 at inlet port 23 and is conducted across the bore 108 to port 26 by means of branch passage 25 which is connected on opposite sides of the bore in an offset manner. Return flow from the motor 29 is conducted to power control valve port 28 and thence to the bore 108 by a cross passage 127 from whence it is conducted to the return port 60 of the power control valve which intersects the bore 108. During this operation land 102 of throttling device 96 is adapted to meter fluid to the motor while the throttling land 104 of the same device is adapted to meter fluid from the left or displacement end of the motor. At the same time the throttling device 96 operates to maintain a substantially constant pressure drop across the motor return and tank ports 68 and 72 of the servo valve 40. The throttling device 98 is operated to an ineffective position before this throttling operation takes place.

When the motor 29 is operated in a rightward directional movement pressure fluid from the source enters the power control valve 24 at inlet port 23 and is conducted across the bore 118 in which throttling device 98 is mounted to the port 28 by means of branch passage 27 which is connected on opposite sides of the bore 118 in an offset manner. Return flow from the right end of motor 29 is conducted to power control valve port 26 and thence to bore 118 by a cross passage 129 from whence it is conducted to the return port 62 of the power control valve which intersects the bore 118. During this operation land 102 of throttling device 98 is adapted to meter fluid to the motor while the throttling land 104 of the same device is adapted to meter fluid from the right or displacement end of the motor. Throttling device 98 at the same time operates to maintain a substantially constant pressure drop across the motor return and tank ports 70 and 72 of the servo valve 40. The throttling device 96 is operated to an ineffective position before this throttling operation takes place.

With the system in operation if the servo control handle 50 is operated to shift the valve spool 42 to the left of the neutral position shown in Figure 3, the motor return port 70 of the servo valve is blocked by land 92 and the motor return port 68 is opened to communication with tank port 72 by land 90. Pressure is transmitted simultaneously to opposite ends of the motor 29 by means of conduit 16, inlet port 23, branch passages 25 and 27, and ports 26 and 28 of the power control valve 24, motor conduits 32 and 33 and the motor ports 30 and 31. As the servo valve motor return port 70 is blocked by land 92, port 62 of the power control valve 24 is also closed from communication with the tank 12. Port 60 of the power control valve 24 is open to tank 12 through the open return port 68 of the servo valve 24. Consequently with pressure being transmitted simultaneously to opposite ends of the motor 29 and with the right end port 30 of the motor being blocked from the tank 12 and the left end or port 31 of the motor being open thereto the motor 29 is operated in a leftward directional movement.

The throttling device 96 is operated in a manner to be effective for controlling the flow of fluid to and from the motor 29 and to maintain the pressure drop across the servo valve throttle 90 constant in the following manner: Fluid displacement from the left end of motor 29 is conducted from port 31 of the motor and conduit 33 to port 28 of the power control valve 24 whence by cross passage 127 it is conducted to bore 108 and thence by port 60 and conduit 64 to the motor return port 68 of servo valve 40. The motor displacement is thence conducted through the servo valve port 72 across throttling land 90 to the tank 12 by means of conduits 74, 76, and 78. Pressure ahead of the throttling land 90 of servo valve 40 is transmitted by means of the bore 108 of the power control valve 24 and spool passage 128 of throttling device 96 to chamber 114 of the device. Pressure beyond the servo valve throttling land 90 is transmitted to chamber 112 of the throttling device 96 by means of conduit 76 and port 130 of the power control valve. Any increase or decrease in pressure ahead of the throttling land 90 of the servo valve 40 is thus immediately sensed in the chamber 114 to operate the control piston 105 of the throttling device 96 and thus the throttling lands 102 and 104 thereof more fully toward the closed or open position. Fluid from the source conducted to the right end of motor 29 is metered across the land 102 of the throttling device 96 while fluid from the motor is metered across the throttling land 104 of the same device.

The speed of the motor is controlled by the amount of opening of the servo valve throttle 90 and by the cooperation of throttling device 96 maintaining a substantially constant pressure drop across the servo valve throttle 90 for every given opening thereof. The amount of the pressure drop is determined by the force of the spring 106. Thus, the flow across the throttle 90 of the servo valve 40 will be maintained at a rate commensurate with the opening of said throttle because the throttling device 96 is responsive to the pressures ahead of and beyond the servo valve throttle 90 to maintain a substantially constant pressure drop thereacross. With the pressure drop across the servo valve throttle remaining substantially constant the gain of the servo valve is constant for every given opening of the throttle.

Throttling device 98 is maintained in an inoperative or ineffective closed position in the following manner: Pressure at the right end of motor 29 at port 30 thereof is also transmitted by means of conduit 32 to port 26 of the power control valve 24 whence by means of cross passage 129 it is transmitted to bore 118 and to chamber 124 of throttling device 98 by means of the spool passage 128. As land 92 of the servo valve 40 has closed servo valve port 70 conduit 66 leading to the port 62 of the power control valve 24 is blocked from communication with the tank 12. Chamber 122 of the throttling device 98 is continuously connected to the tank 12 beyond the servo valve 40 and as high pressure exists in the chamber 124 of the same device there is a relatively high pressure differential created in the two chambers greater than the force of spring 106. The relatively high pressure present in chamber 124 causes the control piston 105 of throttling device 98 to be shifted leftwardly and thus cause the spool lands 102 and 104 thereof to completely close the branch passage 27 to port 28 and also close the cross passage 129 to the port 62.

The control handle 50 of servo valve 40 may be operated in a manner to selectively operate the motor 29 at any rate desired or it may be shifted to a predetermined position to obtain a predetermined positional movement of the motor. The follow-up linkage associated with the extending portion 45 of servo valve spool 42 causes relative movement of the body and valve spool and returns the valve to the neutral position shown to stop the motor.

If the servo valve spool 42 is shifted to the right the operations last recited are reversed. Servo valve motor port 68 is blocked from communication with the tank port 72 by land 90 and land 92 maintains communication between motor return port 70 and tank port 72. Pressure fluid from the source is conducted to the left end of motor 29 by pressure conduit 16, inlet port 23 of power control valve 24, branch passage 27 across the bore 118 to port 28, conduit 33 and fluid motor port 31. Displacement from the right end of motor 29 is conducted by motor port 30 and conduit 32 to power control valve port 26 and by means of cross passage 129 to bore 118 and thence to port 62. Fluid displacement is then conducted by means of conduit 66 to servo valve port 70 and across throttling land 92 to tank port 72 from whence it is conducted to tank 12 by means of conduits 74, 76, and 78.

The throttling device 96 is operated to an ineffective position and maintained inoperative in the following manner:

The inlet motor pressure existent at port 28 of the power control valve is transmitted by cross passage 127 thereof to bore 108 of throttling device 96 and as port 60 of the device is closed from communication with the tank at the servo valve by land 90 thereof the high pressure is transmitted by spool bore 128 to chamber 114 of throttling device 96. With chamber 112 being connected to tank 12 beyond the servo valve 40 the relatively high pressure differential present in the chambers 112 and 114 which is greater than the force of spring 106 causes the control piston 105 of the throttling device 96 to be operated rightwardly and the lands 102 and 104 thereof to close the branch passage 25 to port 26 and also the cross passage 127 from communication with port 60.

The throttling device 96 is thus ineffective and the throttling device 98 is effective to throttle or meter flow to and from the motor 29 and to maintain the pressure drop across the servo valve throttle 92 substantially constant. Pressure ahead of servo valve throttle 92 is transmitted to chamber 124 of throttling device 98 by means of cross passage 129, bore 118 and spool passage 128. Pressure beyond the servo valve throttle 92 is transmitted to chamber 122 by means of conduits 74 and 76 and port 132 of the power control valve 24. Any increase or decrease of pressure ahead of throttle 92 is transmitted to chamber 124 and to operating piston 105 of throttling device 98 which senses the pressure changes to operate the spool 100 and thus cause the lands 102 and 104 thereof to more fully close or open the inlet flow passage 27 and the cross passage 129 acting as a motor return passage and leading to port 62.

Thus each throttling device meters fluid to and from the motor. The amount of fluid metered is dependent upon the opening of the servo valve throttles and is in amounts to maintain the pressure drop constant across the servo valve throttle. As the volume that flows across the servo valve throttle is constantly regulated the gain of the servo valve will be constant for every given opening of the servo valve throttle independently of load pressure variations. The motor may thus be accurately controlled not only as to amplitude of movement but as to rate of movement by the servo valve in cooperation with the power control valve.

As previously recited, it is preferred that the servo valve be designed to permit leakage across the operating ports of the valve which should be greater than the static leakage of the throttling devices of the power control valve 24. If flow ceased through the throttling devices the operating springs thereof would shift the devices to their fully open position. If the servo valve was then operated from the neutral position the flow rate across the servo valve throttle would be temporarily uncontrolled. Although the lapse would be only temporary until the throttling device shifted into a throttling operating position, it would in some cases cause motor jump. Where extremely accurate and precise control is desired this is harmful. By permitting leakage across the neutral positioned servo valve throttles through the power control valve 24 the throttling devices are continually maintained in operating position when the servo valve is in a neutral position. Thus, when the servo valve is shifted from neutral to an operating position the throttling devices of the power control valve are already in operating position to immediately cooperate with the servo valve for immediate and accurate response and control of the motor.

In addition, shock loads transmitted to the servo valve will be immediately dampened at the throttling device of the power control valve. As the pressure drop is controlled across the servo valve, when the valve is operated due to a shock load, high frequency chatter is not permitted to develop at the servo valve. Unlike conventional hydraulic servo mechanism systems, in addition to cushioning at the opposite ends of the motor the large operating areas of the pistons of the throttling device provide adequate dampening which prevents natural high frequency chatter to develop. As the servo valve metering is at a constant pressure, being under the constant control of the throttles in the power control valve, the Bernoulli forces acting on the servo valve are low and there is consequently no greatly unbalanced flow energy for creating oscillation instability at the servo valve. Any oscillation tendency there may be is very easily handled by inherent damping in the servo valve due to either sliding or viscous friction which is sufficient to prevent oscillation of this type. As to oscillations caused from the feedback which could be coupled therewith, the feedback has to be initiated by motion of the load and the load is controlled by the power control valve throttles. The decay in amplitude of motion of the operating pistons for the throttles of the power control valve as frequency increases, cuts down the amplitude of motion of the load and hence the feedback oscillation to the servo valve spool. Consequently the effect of factors in the feed-back system causing lag are not felt at high frequencies and a stable system is the result.

It should thus be noted that the incorporation of the power control valve in the servo system in the manner recited causes the flow from the source to pass through a variable throttle ahead of the motor and that return flow from the motor passes through a second variable throttle and then lastly through a third variable throttle. The first and the second variable throttles have a single operating means which is responsive to the pressures ahead of and beyond the third servo control throttle, the opening of which may be selectively controlled. In addition to controlling fluid to the motor the power control devices maintain a constant pressure drop across the servo valve throttles so as to maintain the gain of the servo valve constant for every given opening of the valve. This gain is constant and accurately controlled independently of load pressure changes.

The system is designed to be responsive and stable and to accurately control not only opposing but overrunning loads. Consequently the invention is very desirable for use in airplane control surface systems where, for example a heavy opposing load may be encountered in the lowering of wing flaps or of an elevator and where the load may become an overrunning one in the raising of such control surfaces. Due to the fact that the return flow is not only metered or controlled at the servo valve but also by the metering land of the throttling device in the power control valve, the displacement of the motor is never more than the design of the system permits. Thus the system is adapted to give precise rate as well as directional responses independently of load variations for actuating both opposing and overrunning loads.

The present system not only gives accurate and precise response and control for every given opening of the servo valve throttle but in addition dangerous flight irregularities due to hunting in the system are eliminated. Hunting difficulties have been circumvented by not permitting unfavorable forces to react on the servo valve during operation either from the input or the feedback side of the system as the pressure drop is always controlled across the servo valve by the pressure operated throttling devices in the power control valve and which also provide sufficient damping qualities as well. Unfavorable conditions reacting on the servo valve to create hunting, such as high pressure drop and unfavorable Bernoulli forces resulting from high dynamic flow conditions are not permitted. The load is not only continually cushioned but any tendency for unfavorable oscillations in the feedback system are immediately sensed, taken up and dissipated at the power control valve.

While the form of embodiment of the invention as herein disclosed constitutes a preferred form, it is to be understood that other forms might be adopted, all coming within the scope of the claims which follow.

What is claimed is as follows:

1. A hydraulic servo control system comprising a fluid motor for driving a load device, means forming a substantially constant pressure fluid source for driving the motor, a servo valve for controlling the directional operation of the motor and linked thereto to provide a follow-up action, said servo valve having ranges of operation providing a variable throttle through which all motor return flow must pass, a second variable throttle through which all motor return flow must pass ahead of the servo valve controlled throttle, said second throttle being responsive to the pressures ahead of and beyond the servo valve controlled throttle to maintain a constant pressure drop thereacross for every opening of the latter throttle, and operating means for the second throttle responsive to the pressure ahead of and beyond the servo valve throttle to cause the second throttle to maintain a constant pressure drop across the servo valve throttle for every opening thereof independently of load pressure variations and thereby maintain the gain of the servo valve constant.

2. A hydraulic servo control system comprising a fluid motor for driving a load device, means forming a substantially constant pressure fluid source for driving the motor, a servo valve for controlling the directional operation of the motor and linked thereto to provide a follow-up action, said servo valve having ranges of operation providing a variable throttle through which all motor return flow must pass, and a power control valve comprising two variable throttles, through one of which all fluid to the motor must pass and through the other of which all return flow from the motor must pass ahead of the servo valve throttle, said power control valve being responsive to the pressures ahead of and beyond the servo valve throttle to maintain the pressure drop thereacross constant for every opening thereof and thereby maintain a constant gain of the servo valve.

3. A hydraulic servo control system comprising a fluid motor for driving a load device, means forming a substantially constant pressure fluid source connected to opposite ends of the motor, a servo control valve linked to the motor to provide a follow-up action and for controlling the directional operation of the motor by selectively opening and closing opposite ends of the motor to a return source, said servo valve having ranges of operation providing a variable throttle through which motor return flow must pass, and a power control valve comprising a variable throttle through which all flow to the motor must pass and a variable throttle through which all flow from the motor must pass ahead of the servo valve throttle, said power control valve being responsive to the pressures ahead of and beyond the servo valve throttle to simultaneously control flow to and from the motor and to maintain a substantially constant pressure drop across the servo valve throttle for every opening thereof to maintain the gain of the servo valve constant.

4. A hydraulic servo mechanism system comprising in combination a reversible fluid motor for driving a load device, means forming a substantially constant pressure fluid source for driving the motor, a servo valve linked to the motor to provide a follow-up action and having ranges of operation providing a variable throttle through which motor return flow must pass, said pressure source being connected to both ends of the motor and said servo valve controlling the direction of operation of the motor by selective opening and closing opposite ends of the motor to a return source, and two double throttling devices, one of said devices being effective in one direction of motor operation and the other device being effective in the other direction of motor operation, each device comprising two variable throttles having a single pressure responsive operating means, flow to the motor passing through one throttle of the device and flow from the motor passing through the other throttle of the device ahead of the servo valve throttle, said devices controlling flow to and from the motor and maintaining a substantially constant pressure drop across the servo valve throttle for every opening thereof and thereby maintaining the gain of the servo valve constant.

5. A hydraulic servo mechanism system comprising a reversible fluid motor for driving a load device, means forming a substantially constant pressure fluid source for driving the motor, a servo valve for controlling the direction of operation of the motor and linked thereto to provide a follow-up action, said servo valve having ranges of operation providing a variable throttle through which all motor return flow must pass, and a second variable throttle through which all return motor flow must also pass ahead of the servo valve throttle, said second throttle being responsive to the pressures ahead of and beyond the servo valve throttle to regulate the flow of fluid through the servo valve throttle and thereby regulate the gain of the servo valve.

6. In a hydraulic servo mechanism system including a reversible fluid motor for driving a load device and a substantially constant pressure fluid source for driving the motor, a servo valve for controlling the directional operation of the motor and having ranges of operation providing a variable throttle through which all motor return flow must pass, a power control device comprising two variable throttles through one of which all flow to the motor must pass and through the other of which all motor return flow must pass ahead of the servo valve throttle, and pressure responsive operating means for both of the power control device throttles responsive to the pressures ahead of and beyond the servo valve throttle to regulate the flow of fluid therethrough for given openings thereof and thereby regulate the gain of the servo valve.

7. A hydraulic servo control system comprising a fluid motor for driving a load device, means forming a substantially constant pressure fluid source for driving the motor, manually operable means for conjointly controlling the directional operation of the motor and for regulating the flow rate therefrom, said means including a servo control valve and a variable throttle through which all motor return flow must pass and the opening of which is controlled by operation of the servo control valve, and a second variable throttle through which all motor return flow must pass ahead of the servo controlled throttle, said second throttle being responsive to the pressures ahead of and beyond the servo controlled throttle to maintain a constant pressure drop thereacross for every opening of the latter throttle.

8. A constant gain hydraulic power control system comprising a reversible fluid motor for driving a load device, means forming a substantially constant pressure fluid source for driving the motor, manually operable means for conjointly controlling the directional operation of the motor and regulating the flow rate therefrom, said means including a first variable throttle through which flow from the motor must pass, and a pair of pressure responsive throttles through one of which flow to the motor must pass and through the other of which flow from the motor must pass ahead of the first variable throttle, said pair of throttles being responsive to the pressures ahead of and beyond the first variable throttle to maintain the pressure drop thereacross constant for every opening thereof and thereby maintaining the gain of the system constant.

References Cited in the file of this patent

UNITED STATES PATENTS

| | | |
|---|---|---|
| 1,964,196 | Cuttat | June 26, 1934 |
| 2,157,707 | Keel | May 9, 1939 |